United States Patent
Templeman

(10) Patent No.: US 10,869,082 B2
(45) Date of Patent: Dec. 15, 2020

(54) PROVIDER-DEFINED LIVE MULTICHANNEL VIEWING EVENTS

(71) Applicant: DISH Technologies L.L.C., Englewood, CO (US)

(72) Inventor: Mark Templeman, Parker, CO (US)

(73) Assignee: DISH Technologies L.L.C., Englewood, CO (US)

(*) Notice: Subject to any disclaimer, the term of this patent is extended or adjusted under 35 U.S.C. 154(b) by 0 days.

(21) Appl. No.: 16/424,915

(22) Filed: May 29, 2019

(65) Prior Publication Data
US 2019/0297375 A1   Sep. 26, 2019

Related U.S. Application Data

(63) Continuation of application No. 15/981,591, filed on May 16, 2018, now Pat. No. 10,349,114, which is a
(Continued)

(51) Int. Cl.
*H04N 21/431* (2011.01)
*H04N 21/482* (2011.01)
(Continued)

(52) U.S. Cl.
CPC ..... *H04N 21/4312* (2013.01); *H04N 21/4316* (2013.01); *H04N 21/4334* (2013.01);
(Continued)

(58) Field of Classification Search
CPC ........... H04N 21/4312; H04N 21/4316; H04N 21/4334; H04N 21/4383; H04N 21/4545; H04N 21/472; H04N 21/4821
See application file for complete search history.

(56) References Cited

U.S. PATENT DOCUMENTS

| 6,005,562 A | 12/1999 | Shiga et al. |
| 6,177,931 B1 | 1/2001 | Alexander et al. |

(Continued)

FOREIGN PATENT DOCUMENTS

| EP | 1 865 716 A2 | 12/2007 |
| EP | 2 309 733 B1 | 4/2011 |

(Continued)

OTHER PUBLICATIONS

Office Action for EP 14160140.1 dated Jan. 19, 2016, 5 pages.
(Continued)

*Primary Examiner* — Pankaj Kumar
*Assistant Examiner* — Alexander Boyd
(74) *Attorney, Agent, or Firm* — Kilpatrick Townsend & Stockton LLP

(57) ABSTRACT

Various arrangements for providing a multichannel viewing event are presented. A definition of the multichannel viewing event may be transmitted to multiple television receivers. A television receiver may, as part of an electronic programming guide, provide a single-selection option to activate the multichannel viewing event based on the definition. In response to receiving user input that selects the single-selection option, the definition of the multichannel viewing event is accessed. The television receiver may output the television channels defined in the definition of the multichannel viewing event. A video stream that includes live feeds of multiple television channels may then be output to a display device for simultaneous presentation.

16 Claims, 9 Drawing Sheets

Related U.S. Application Data continuation of application No. 15/218,321, filed on Jul. 25, 2016, now Pat. No. 10,015,539.

(51) Int. Cl.
  *H04N 21/438* (2011.01)
  *H04N 21/433* (2011.01)
  *H04N 21/4545* (2011.01)
  *H04N 21/472* (2011.01)

(52) U.S. Cl.
  CPC ..... *H04N 21/4383* (2013.01); *H04N 21/4545* (2013.01); *H04N 21/472* (2013.01); *H04N 21/4821* (2013.01)

(56) References Cited

U.S. PATENT DOCUMENTS

| | | | |
|---|---|---|---|
| 6,681,396 | B1 | 1/2004 | Bates et al. |
| 7,174,512 | B2 | 2/2007 | Martin et al. |
| 7,197,715 | B1 | 3/2007 | Valeria |
| 7,633,887 | B2 | 12/2009 | Panwar et al. |
| 7,680,894 | B2 | 3/2010 | Diot et al. |
| 7,774,811 | B2 | 8/2010 | Poslinski et al. |
| 7,818,368 | B2 | 10/2010 | Yang et al. |
| 7,825,989 | B1 | 11/2010 | Greenberg |
| 7,849,487 | B1 | 12/2010 | Vosseller |
| 8,024,753 | B1 | 9/2011 | Kummer et al. |
| 8,046,798 | B1 | 10/2011 | Schlack et al. |
| 8,079,052 | B2 | 12/2011 | Chen et al. |
| 8,104,065 | B2 | 1/2012 | Aaby et al. |
| 8,209,713 | B1 | 6/2012 | Lai et al. |
| 8,296,797 | B2 | 10/2012 | Olstad et al. |
| 8,312,486 | B1 | 11/2012 | Briggs et al. |
| 8,424,041 | B2 | 4/2013 | Candelore et al. |
| 8,427,356 | B1 | 4/2013 | Satish |
| 8,627,349 | B2 | 1/2014 | Kirby et al. |
| 8,689,258 | B2 | 4/2014 | Kemp |
| 8,752,084 | B1 | 6/2014 | Lai et al. |
| 8,949,910 | B2 | 2/2015 | Meredith et al. |
| 8,973,038 | B2 | 3/2015 | Gratton |
| 8,973,068 | B2 | 3/2015 | Kotecha et al. |
| 8,990,418 | B1 | 3/2015 | Bragg et al. |
| 9,038,127 | B2 | 5/2015 | Hastings et al. |
| 9,066,156 | B2 | 6/2015 | Kapa |
| 9,213,986 | B1 | 12/2015 | Buchheit et al. |
| 9,253,533 | B1 | 2/2016 | Morgan et al. |
| 9,264,779 | B2 | 2/2016 | Kirby et al. |
| 9,420,333 | B2 | 8/2016 | Martch et al. |
| 9,860,477 | B2 | 1/2018 | Kummer et al. |
| 9,973,807 | B2 * | 5/2018 | Greene ................ H04N 21/462 |
| 10,015,539 | B2 | 7/2018 | Templeman |
| 10,021,448 | B2 | 7/2018 | Gratton et al. |
| 10,349,114 | B2 | 7/2019 | Templeman |
| 2001/0013123 | A1 | 8/2001 | Freeman et al. |
| 2001/0026609 | A1 | 10/2001 | Weinstein et al. |
| 2002/0059610 | A1 | 5/2002 | Ellis |
| 2002/0067376 | A1 | 6/2002 | Martin et al. |
| 2002/0075402 | A1 | 6/2002 | Robson et al. |
| 2002/0166122 | A1 | 11/2002 | Kikinis et al. |
| 2002/0174430 | A1 | 11/2002 | Ellis et al. |
| 2002/0178444 | A1 | 11/2002 | Trajkovic et al. |
| 2003/0023742 | A1 | 1/2003 | Allen et al. |
| 2003/0056220 | A1 | 3/2003 | Thornton et al. |
| 2003/0066077 | A1 | 4/2003 | Gutta et al. |
| 2003/0118014 | A1 | 6/2003 | Iyer et al. |
| 2003/0126605 | A1 | 7/2003 | Betz et al. |
| 2003/0126606 | A1 | 7/2003 | Buczak et al. |
| 2003/0188317 | A1 | 10/2003 | Liew et al. |
| 2003/0189674 | A1 | 10/2003 | Inoue et al. |
| 2003/0208763 | A1 | 11/2003 | McElhatten et al. |
| 2003/0229899 | A1 | 12/2003 | Thompson et al. |
| 2004/0181807 | A1 | 9/2004 | Theiste et al. |
| 2005/0030977 | A1 | 2/2005 | Casey et al. |
| 2005/0044570 | A1 | 2/2005 | Poslinski |
| 2005/0071865 | A1 | 3/2005 | Martins |
| 2005/0125302 | A1 | 6/2005 | Brown et al. |
| 2005/0152565 | A1 | 7/2005 | Jouppi et al. |
| 2005/0166230 | A1 | 7/2005 | Gaydou et al. |
| 2005/0180568 | A1 | 8/2005 | Krause |
| 2005/0191041 | A1 | 9/2005 | Braun et al. |
| 2005/0240961 | A1 | 10/2005 | Jerding et al. |
| 2005/0264705 | A1 | 12/2005 | Kitamura |
| 2006/0020962 | A1 | 1/2006 | Stark et al. |
| 2006/0085828 | A1 | 4/2006 | Dureau et al. |
| 2006/0174277 | A1 | 8/2006 | Sezan et al. |
| 2006/0190615 | A1 | 8/2006 | Panwar et al. |
| 2006/0238656 | A1 | 10/2006 | Chen et al. |
| 2006/0253581 | A1 | 11/2006 | Dixon et al. |
| 2006/0282852 | A1 | 12/2006 | Purpura et al. |
| 2006/0282869 | A1 | 12/2006 | Plourde, Jr. |
| 2007/0033616 | A1 | 2/2007 | Gutta |
| 2007/0058930 | A1 | 3/2007 | Iwamoto |
| 2007/0074256 | A1 | 3/2007 | Jung et al. |
| 2007/0083901 | A1 | 4/2007 | Bond |
| 2007/0124773 | A1 | 5/2007 | Morris |
| 2007/0127894 | A1 | 6/2007 | Ando et al. |
| 2007/0146554 | A1 | 6/2007 | Strickland et al. |
| 2007/0154163 | A1 | 7/2007 | Cordray |
| 2007/0154169 | A1 | 7/2007 | Cordray et al. |
| 2007/0157235 | A1 | 7/2007 | Teunissen |
| 2007/0157248 | A1 * | 7/2007 | Ellis .................... H04N 21/482 725/47 |
| 2007/0157249 | A1 | 7/2007 | Cordray et al. |
| 2007/0157253 | A1 | 7/2007 | Ellis et al. |
| 2007/0188655 | A1 | 8/2007 | Ohta |
| 2007/0199040 | A1 | 8/2007 | Kates |
| 2007/0204302 | A1 | 8/2007 | Calzone |
| 2007/0220551 | A1 | 9/2007 | Shanks et al. |
| 2007/0226766 | A1 | 9/2007 | Poslinski et al. |
| 2007/0245379 | A1 | 10/2007 | Agnihortri |
| 2008/0022012 | A1 | 1/2008 | Wang |
| 2008/0060006 | A1 | 3/2008 | Shanks et al. |
| 2008/0086743 | A1 | 4/2008 | Cheng et al. |
| 2008/0097949 | A1 | 4/2008 | Kelly et al. |
| 2008/0109307 | A1 | 5/2008 | Ullah |
| 2008/0134043 | A1 | 6/2008 | Georgis et al. |
| 2008/0163305 | A1 | 7/2008 | Johnson et al. |
| 2008/0195457 | A1 | 8/2008 | Sherman et al. |
| 2008/0235348 | A1 | 9/2008 | Dasgupta |
| 2008/0239169 | A1 | 10/2008 | Moon et al. |
| 2008/0300982 | A1 | 12/2008 | Larson et al. |
| 2008/0320523 | A1 | 12/2008 | Morris et al. |
| 2009/0044217 | A1 | 2/2009 | Lutterbach et al. |
| 2009/0055385 | A1 | 2/2009 | Jeon et al. |
| 2009/0102984 | A1 | 4/2009 | Arling et al. |
| 2009/0138902 | A1 | 5/2009 | Kamen |
| 2009/0178071 | A1 | 7/2009 | Whitehead |
| 2009/0234828 | A1 | 9/2009 | Tu |
| 2009/0249412 | A1 | 10/2009 | Bhogal et al. |
| 2009/0293093 | A1 | 11/2009 | Igarashi |
| 2009/0299824 | A1 | 12/2009 | Barnes, Jr. |
| 2009/0325523 | A1 | 12/2009 | Choi |
| 2010/0040151 | A1 | 2/2010 | Garrett |
| 2010/0071007 | A1 | 3/2010 | Meijer |
| 2010/0071062 | A1 | 3/2010 | Choyi et al. |
| 2010/0089996 | A1 | 4/2010 | Koplar |
| 2010/0115554 | A1 | 5/2010 | Drouet et al. |
| 2010/0122294 | A1 | 5/2010 | Craner |
| 2010/0146560 | A1 | 6/2010 | Bonfrer |
| 2010/0153983 | A1 | 6/2010 | Philmon et al. |
| 2010/0153999 | A1 | 6/2010 | Yates |
| 2010/0158479 | A1 | 6/2010 | Craner |
| 2010/0166389 | A1 | 7/2010 | Knee et al. |
| 2010/0169925 | A1 | 7/2010 | Takegoshi |
| 2010/0218214 | A1 | 8/2010 | Fan et al. |
| 2010/0251295 | A1 | 9/2010 | Amento et al. |
| 2010/0262986 | A1 | 10/2010 | Adimatyam et al. |
| 2010/0269144 | A1 | 10/2010 | Forsman et al. |
| 2010/0319019 | A1 | 12/2010 | Zazza |
| 2010/0322592 | A1 | 12/2010 | Casagrande |
| 2010/0333131 | A1 | 12/2010 | Parker et al. |
| 2011/0016492 | A1 | 1/2011 | Morita |
| 2011/0019839 | A1 | 1/2011 | Nandury |
| 2011/0052156 | A1 | 3/2011 | Kuhn |

(56) References Cited

U.S. PATENT DOCUMENTS

| | | |
|---|---|---|
| 2011/0072448 A1 | 3/2011 | Stiers et al. |
| 2011/0109801 A1 | 5/2011 | Thomas et al. |
| 2011/0202956 A1 | 8/2011 | Connelly et al. |
| 2011/0206342 A1 | 8/2011 | Thompson et al. |
| 2011/0239249 A1 | 9/2011 | Munson et al. |
| 2011/0243533 A1 | 10/2011 | Stern et al. |
| 2011/0252451 A1 | 10/2011 | Turgeman et al. |
| 2011/0289410 A1 | 11/2011 | Paczkowski et al. |
| 2011/0293113 A1 | 12/2011 | McCarthy |
| 2011/0314502 A1 | 12/2011 | Levy et al. |
| 2012/0020641 A1 | 1/2012 | Sakaniwa et al. |
| 2012/0052941 A1 | 3/2012 | Mo |
| 2012/0060178 A1 | 3/2012 | Minakuchi et al. |
| 2012/0106932 A1 | 5/2012 | Grevers, Jr. |
| 2012/0131613 A1 | 5/2012 | Ellis et al. |
| 2012/0185895 A1 | 7/2012 | Wong et al. |
| 2012/0204209 A1 | 8/2012 | Kubo |
| 2012/0230651 A1 | 9/2012 | Chen |
| 2012/0246672 A1 | 9/2012 | Sridhar et al. |
| 2012/0264504 A1 | 10/2012 | Gagner et al. |
| 2012/0278837 A1 | 11/2012 | Curtis et al. |
| 2012/0311633 A1 | 12/2012 | Mandrekar et al. |
| 2013/0014159 A1 | 1/2013 | Wiser et al. |
| 2013/0055304 A1 | 2/2013 | Kirby et al. |
| 2013/0061313 A1 | 3/2013 | Cullimore et al. |
| 2013/0074109 A1 | 3/2013 | Skelton et al. |
| 2013/0114940 A1 | 5/2013 | Merzon et al. |
| 2013/0128119 A1 | 5/2013 | Madathodiyil et al. |
| 2013/0145023 A1 | 6/2013 | Li et al. |
| 2013/0174196 A1 | 7/2013 | Herlein |
| 2013/0194503 A1 | 8/2013 | Yamashita |
| 2013/0243402 A1 | 9/2013 | Kummer et al. |
| 2013/0263189 A1 | 10/2013 | Garner |
| 2013/0283162 A1 | 10/2013 | Aronsson et al. |
| 2013/0298151 A1 | 11/2013 | Leske et al. |
| 2013/0332962 A1 | 12/2013 | Moritz et al. |
| 2013/0346302 A1 | 12/2013 | Purves et al. |
| 2014/0032709 A1 | 1/2014 | Saussy et al. |
| 2014/0068675 A1 | 3/2014 | Mountain |
| 2014/0123160 A1 | 5/2014 | van Coppenolle et al. |
| 2014/0139555 A1 | 5/2014 | Levy |
| 2014/0140680 A1 | 5/2014 | Jo |
| 2014/0153904 A1 | 6/2014 | Adimatyam et al. |
| 2014/0157327 A1 | 6/2014 | Roberts et al. |
| 2014/0195675 A1 | 7/2014 | Silver |
| 2014/0215539 A1 | 7/2014 | Chen et al. |
| 2014/0282714 A1 | 9/2014 | Hussain |
| 2014/0282741 A1 | 9/2014 | Shoykhet |
| 2014/0282745 A1 | 9/2014 | Chipman et al. |
| 2014/0282759 A1 | 9/2014 | Harvey et al. |
| 2014/0294201 A1 | 10/2014 | Johnson et al. |
| 2014/0310819 A1 | 10/2014 | Cakarel et al. |
| 2014/0313341 A1 | 10/2014 | Stribling |
| 2014/0325556 A1 | 10/2014 | Hoang et al. |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0020097 A1 | 1/2015 | Freed et al. |
| 2015/0026596 A1 | 1/2015 | Tseng |
| 2015/0040176 A1 | 2/2015 | Hybertson et al. |
| 2015/0058890 A1 | 2/2015 | Kapa |
| 2015/0095932 A1 | 4/2015 | Ren |
| 2015/0118992 A1 | 4/2015 | Wyatt et al. |
| 2015/0121431 A1 | 4/2015 | Jacoby et al. |
| 2015/0181132 A1 | 6/2015 | Kummer et al. |
| 2015/0181279 A1 | 6/2015 | Martch et al. |
| 2015/0249803 A1 | 9/2015 | Tozer et al. |
| 2015/0249864 A1 | 9/2015 | Tang et al. |
| 2015/0310725 A1 | 10/2015 | Koskan et al. |
| 2015/0334461 A1 | 11/2015 | Yu |
| 2015/0350729 A1 | 12/2015 | Reynolds |
| 2016/0066020 A1 | 3/2016 | Mountain |
| 2016/0066026 A1 | 3/2016 | Mountain |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli et al. |
| 2016/0127763 A1 | 5/2016 | Patel et al. |
| 2016/0191147 A1 | 6/2016 | Martch |
| 2016/0195926 A1 | 7/2016 | Imoto et al. |
| 2016/0198229 A1 | 7/2016 | Keipert |
| 2016/0309212 A1 | 10/2016 | Martch et al. |
| 2018/0027279 A1 | 1/2018 | Templeman |
| 2018/0249203 A1 | 8/2018 | Gratton et al. |
| 2018/0262797 A1 | 9/2018 | Templeman |

FOREIGN PATENT DOCUMENTS

| | | |
|---|---|---|
| EP | 2 403 239 A1 | 1/2012 |
| FR | 2 902 568 A1 | 12/2007 |
| JP | H10 322622 A | 12/1998 |
| JP | 2006-245745 A | 9/2006 |
| KR | 2004 0025073 A | 3/2004 |
| KR | 2006 0128295 A | 12/2006 |
| WO | 98/37694 A1 | 8/1998 |
| WO | 2005/059807 A2 | 6/2005 |
| WO | 2007/064987 A2 | 6/2007 |
| WO | 2007/098067 A1 | 8/2007 |
| WO | 2009/073925 A1 | 6/2009 |
| WO | 2013/016626 A1 | 1/2013 |
| WO | 2014/072742 A1 | 5/2014 |
| WO | 2014/179017 A1 | 11/2014 |
| WO | 2016/030384 | 3/2016 |
| WO | 2016/030477 A1 | 3/2016 |
| WO | 2016/034899 A1 | 3/2016 |
| WO | 2016/055761 A1 | 4/2016 |

OTHER PUBLICATIONS

International Search Report and Written Opinion for PCT/EP2015/069461 dated Oct. 1, 2015, 13 pages.

International Search Report and Written Opinion for PCT/EP2015/069456 dated Oct. 5, 2015, all pages.

International Search Report and Written Opinion of PCT/US2014/033796 dated Sep. 5, 2014, 12 pages.

International Preliminary Report on Patentability for PCT/US2014/033796 dated Nov. 3, 2015, all pages.

International Search Report and Written Opinion for PCT/EP2015/069681 dated Nov. 23, 2015, 12 pages.

International Search Report and Written Opinion for PCT/GB2015/052570 dated Dec. 11, 2015, 13 pages.

Extended European Search Report for EP 11166892.7 dated Oct. 6, 2011, 7 pages.

Extended European Search Report for EP 14160140.1 dated Jul. 7, 2014, 7 pages.

Jin S H et al., "Intelligent broadcasting system and services for personalized semantic contents consumption", Expert Systems With Applications, Oxford, GB, vol. 31, No. 1, Jul. 1, 2006, pp. 164-173, XP024962718, ISSN: 0957-4174, DOI: 10.1016/J.ESWA.2005.09.021.

Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.

European Search Report for EP 14197940.1 dated Apr. 28, 2015, 13 pages.

International Search Report and Written Opinion for PCT/GB2015/052456 dated Jun. 13, 2016, all pages.

International Preliminary Report on Patentability for PCT/GB2015/052456 dated Feb. 28, 2017, all pages. 83901.

U.S. Appl. No. 15/218,321, filed Jul. 25, 2016 Non-Final Rejection dated May 26, 2017, all pages.

U.S. Appl. No. 15/218,321, filed Jul. 25, 2016 Final Rejection dated Oct. 15, 2017, all pages.

U.S. Appl. No. 15/218,321, filed Jul. 25, 2016 Notice of Allowance dated Feb. 13, 2018, all pages.

(56) References Cited

OTHER PUBLICATIONS

U.S. Appl. No. 14/139,299, filed Dec. 23, 2013 Non-Final Rejection dated Aug. 14, 2015, all pages.
U.S. Appl. No. 14/139,299, filed Dec. 23, 2013 Final Rejection dated Feb. 25, 2016, all pages.
U.S. Appl. No. 14/139,299, filed Dec. 23, 2013 Non-Final Rejection dated Jun. 20, 2016, all pages.
U.S. Appl. No. 14/139,299, filed Dec. 23, 2013 Final Rejection dated Jan. 30, 2017, all pages.
U.S. Appl. No. 14/139,299, filed Dec. 23, 2013 Notice of Allowance dated Aug. 16, 2017, all pages.
U.S. Appl. No. 14/139,420, filed Dec. 23, 2013 Non-Final Rejection dated Apr. 30, 2015, all pages.
U.S. Appl. No. 14/139,420, filed Dec. 23, 2013 Notice of Allowance dated Mar. 31, 2016, all pages.
U.S. Appl. No. 15/981,591, filed May 16, 2018 Non-Final Rejection dated Oct. 22, 2018, all pages.
U.S. Appl. No. 15/981,591, filed May 16, 2018 Notice of Allowance dated Mar. 1, 2019, all pages.
U.S. Appl. No. 15/963,494, filed Apr. 26, 2018 Non-Final Rejection dated Sep. 21, 2018, all pages.
U.S. Appl. No. 15/963,494, filed Apr. 26, 2018 Final Rejection dated Mar. 29, 2019, all pages.
U.S. Appl. No. 15/963,494, filed Apr. 26, 2018 Notice of Allowance dated Jun. 18, 2019, all pages.
U.S. Appl. No. 15/359,359, filed Nov. 22, 2016 Non-Final Rejection dated Sep. 11, 2017, all pages.
U.S. Appl. No. 15/359,359, filed Nov. 22, 2016 Notice of Allowance dated Jan. 22, 2018, all pages.

* cited by examiner

PROVIDER-DEFINED LIVE MULTICHANNEL VIEWING EVENTS

CROSS-REFERENCE TO RELATED APPLICATION

This application is a continuation of U.S. patent application Ser. No. 15/981,591, filed May 16, 2018, entitled "Provider-Defined Live Multichannel Viewing Events," which application is a continuation of U.S. patent application Ser. No. 15/218,321, filed Jul. 25, 2016, entitled "Provider-Defined Live Multichannel Viewing Events," now U.S. Pat. No. 10,015,539, issued Jul. 3, 2018, which application is related to U.S. patent application Ser. No. 14/139,299, filed Dec. 23, 2013, entitled "Customized Video Mosaic," now U.S. Pat. No. 9,860,477, issued Jan. 2, 2018, and U.S. patent application Ser. No. 14/139,420, also filed Dec. 23, 2013, entitled "Mosaic Focus Control," now U.S. Pat. No. 9,420,333, issued Aug. 16, 2016. The disclosures of the above-identified patent applications are incorporated by reference in their entirety for all purposes.

BACKGROUND

Demand for coverage of live events has skyrocketed in recent years. In response, coverage of live events has been increased to match the public's demand. While in the past it was common for a single live feed of an event to be broadcast, now may feeds of different aspects of an event may be broadcast simultaneously. For example, multiple games of a sports tournament may be broadcast live on different television channels at the same time. This can present a quandary for the modern television viewer. Frequently, such events are split among television channels rarely watched by the viewer (thus, for instance, resulting in the user not being aware of the television channels' numbers) and requiring incessant switching between these channels in order to stay apprised of the multiple games. Such an arrangement can be inefficient and frustrating, decreasing the viewer's enjoyment of the event and his ability to stay up-to-date on the simultaneous events across multiple channels.

SUMMARY

Various methods, systems, television receivers, and processor-readable mediums are detailed for providing a multichannel viewing event. A multichannel viewing event definition may be broadcast to a plurality of television receivers. The definition of the multichannel viewing event may define: a plurality of television channels to be included as part of the multichannel viewing event and a multichannel viewing event title. The definition of the multichannel viewing event may be stored by the television receiver. The television receiver may provide, as part of an electronic programming guide (EPG), a single-selection option to activate the multichannel viewing event based on the multichannel viewing event definition, wherein the multichannel viewing event title is presented in association with the single-selection option as part of the EPG. User input may be received by the television receiver that selects the single-selection option. In response to receiving the user input that selects the single-selection option, the television receiver may access the stored definition of the multichannel viewing event. In response to the user input and the accessed stored definition of the multichannel viewing event, one or more tuners of the television receiver may be tuned based on the plurality of television channels defined in the definition of the multichannel viewing event. A quad video stream may be output that includes live feeds of four television channels from the plurality of television channels, and, when presented by a display device, the quad video stream results in the live feeds of the four television channels being presented simultaneously.

Various arrangements may include one or more of the following features: The definition of the multichannel viewing event may include a start time and an end time. The television receiver may compare a current time with the start time and the end time. The television receiver may determine that the current time is between the start time and the end time. Providing the single-selection option to activate the multichannel viewing event may be based on the multichannel viewing event definition as part of the EPG is based on determining that the current time is between the start time and the end time. The single-selection option being provided to activate the multichannel viewing event based on the multichannel viewing event definition may include providing a plurality of single-selections, wherein each single-selection option of the plurality of single-selection options activates a different multichannel viewing event based on distinct multichannel viewing event definitions. In response to the user input and the accessed stored definition of the multichannel viewing event, a plurality of packet identifier (PID) filters may be instantiated. For each television channel of the plurality, a video PID filter may be instantiated. The plurality of television channels may include five or more distinct television channels. The definition of the multichannel viewing event may include a ranking scheme that ranks the plurality of television channels. The television receiver may identify at least a subset of the plurality of television channels that the television receiver is authorized for presentation based on a local subscription check. The four television channels may be selected for output based on the ranking scheme and the four television channels being identified as part of at least the subset of the plurality of television channels authorized for presentation. A default television channel may be selected from at least the subset of the plurality of television channels for audio output based on the ranking scheme, wherein audio output is enabled for only a single television channel at a given time. While outputting the quad high definition video stream that comprises the live feeds of the four television channels, user input may be received that is indicative of a pause command particular to a television channel of the four television channels being output for presentation. The television receiver may pause output of the television channel while maintaining output of live feeds of the other three television channels. The television channel may be recorded in response to the pause command particular to the television channel. Each channel of the four television channels may be output at a resolution of 1080P.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
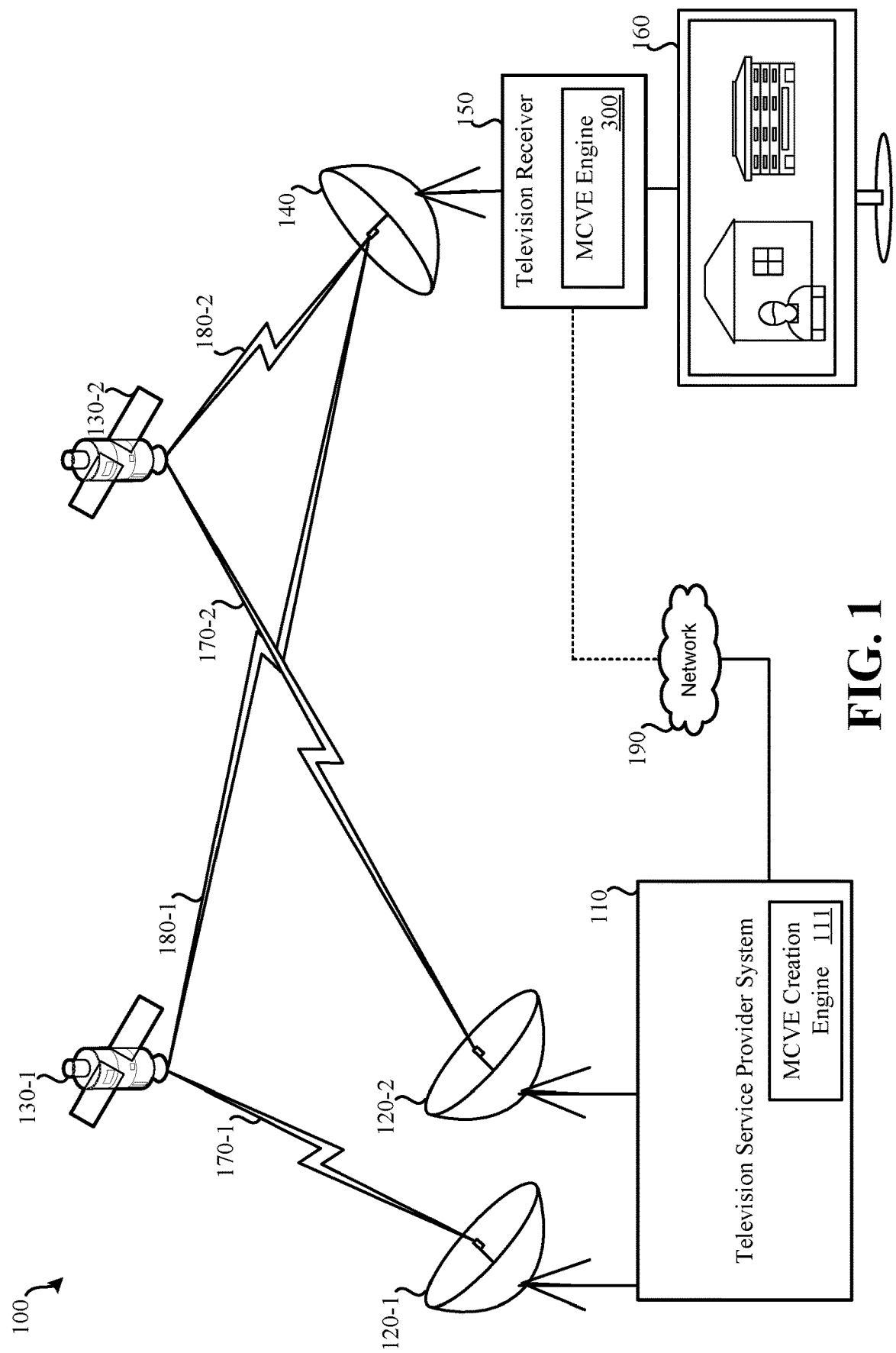
FIG. 1 illustrates an embodiment of a satellite-based television distributions system.

A television service provider may define a multichannel viewing event (MCVE) that will be accessible to all or a subset of the television service provider's subscribers. Such an MCVE may allow a user to make a single selection, such as of an element presented in an electronic programming guide (EPG) that configurations presentation of a preset group of television channels selected by the television service provider. The television service provider may broadcast an MCVE definition to various television receivers. This MCVE definition may define a number of channels, such as four or more. This MCVE definition may also define a start and end time of the MCVE. The MCVE may only be available for activation by a viewer during the time period defined by the start time and end time.

Such an MCVE may be particularly useful to a user when: (1) an event is being broadcast for which different aspects are simultaneously appearing on multiple television channels; and/or (2) an event that is being broadcast on multiple television channels is being broadcast of television channels which the user is unfamiliar. As an example, while a viewer may be aware that the Olympics are being broadcast live on multiple different television channels, the viewer may only be familiar with one or two of the television channels on which the Olympic events are being broadcast, while in fact one, two, or more additional television channels are simultaneously carrying additional events or aspects (e.g., commentary, medal ceremonies, Athlete personal interest stories) of the Olympics.

When a viewer is presented with an option of initiating an MCVE in an EPG, the user can assume that the MCVE is active or is expected to start soon. When the MCVE is selected by the viewer for initiation, the television receiver may access a stored definition of the MCVE to determine which television channels are associated with the MCVE. In a typical arrangement, four channels may be output for presentation via a display device simultaneously. The MCVE definition may include more than four television channels, however. This arrangement may be useful if one or more of the television channels included in the MCVE definition are not part of a subscription active at the television receiver. These television channels may be ranked as part of the MCVE definition such that the four highest ranked television channels are presented as part of the MCVE.

Assuming the television receiver is authorized to decode at least some television channels of the MCVE, the television receiver may tune one or more tuners to the television channels indicated in the MCVE definition and decode the television channels. The four television channels may be output to a television (or other form of display device) simultaneously such that the output signal to the television causes each of the four television channels to be presented in a different quadrant of the television. Only one audio stream for one of the television channels may be output to the television, sound system, or display device at a given time based on viewer selection. Each of the output television channels, despite being presented on only a quadrant of the television's display, may be presented in high resolution (e.g., 1080P), which may be the same resolution as if the television channel was being presented on the full television display. By decoding the television channel at full resolution despite being presented in only a quadrant of a television, a switching time from the television channel being presented in the quadrant to full screen mode may be decreased since a tuner of the television receiver would not need to be tuned to another data stream (e.g., a different transponder stream) and the television channel is already being decoded to a highest available resolution. The following figures and associated description provide a higher level of detail of the functionality involved in MCVEs.

FIG. 1 illustrates an embodiment of a satellite-based television distributions system 100. Satellite-based television distribution system 100 may include: television service provider system 110, satellite transmitter equipment 120, satellites 130, satellite dish 140, television receiver 150, and display device 160. Alternate embodiments of satellite-based television distribution system 100 may include fewer or greater numbers of components. While only one satellite dish 140, television receiver 150, and display device 160 (which can collectively be referred to as "user equipment") are illustrated, it should be understood that multiple (e.g., tens, thousands, millions) instances of user equipment may receive television signals from television service provider system 110 via satellites 130.

Television service provider system 110 and satellite transmitter equipment 120 may be operated by a television service provider. A television service provider may distribute television channels, on-demand programming, programming information, data (e.g., one or more MCVE definitions), firmware updates (which can include one or more MCVE definitions) and/or other content/services to users. Television service provider system 110 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 (120-1, 120-2) may be used to transmit a feed of one or more television channels from television service provider system 110 to one or more satellites 130. While a single television service provider system 110 and satellite transmitter equipment 120 are illustrated as part of satellite-based television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder streams 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions. For an MCVE event, each of the television channels that are part of the event may be transmitted as part of the same transponder stream or may be spread among multiple transponder streams.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
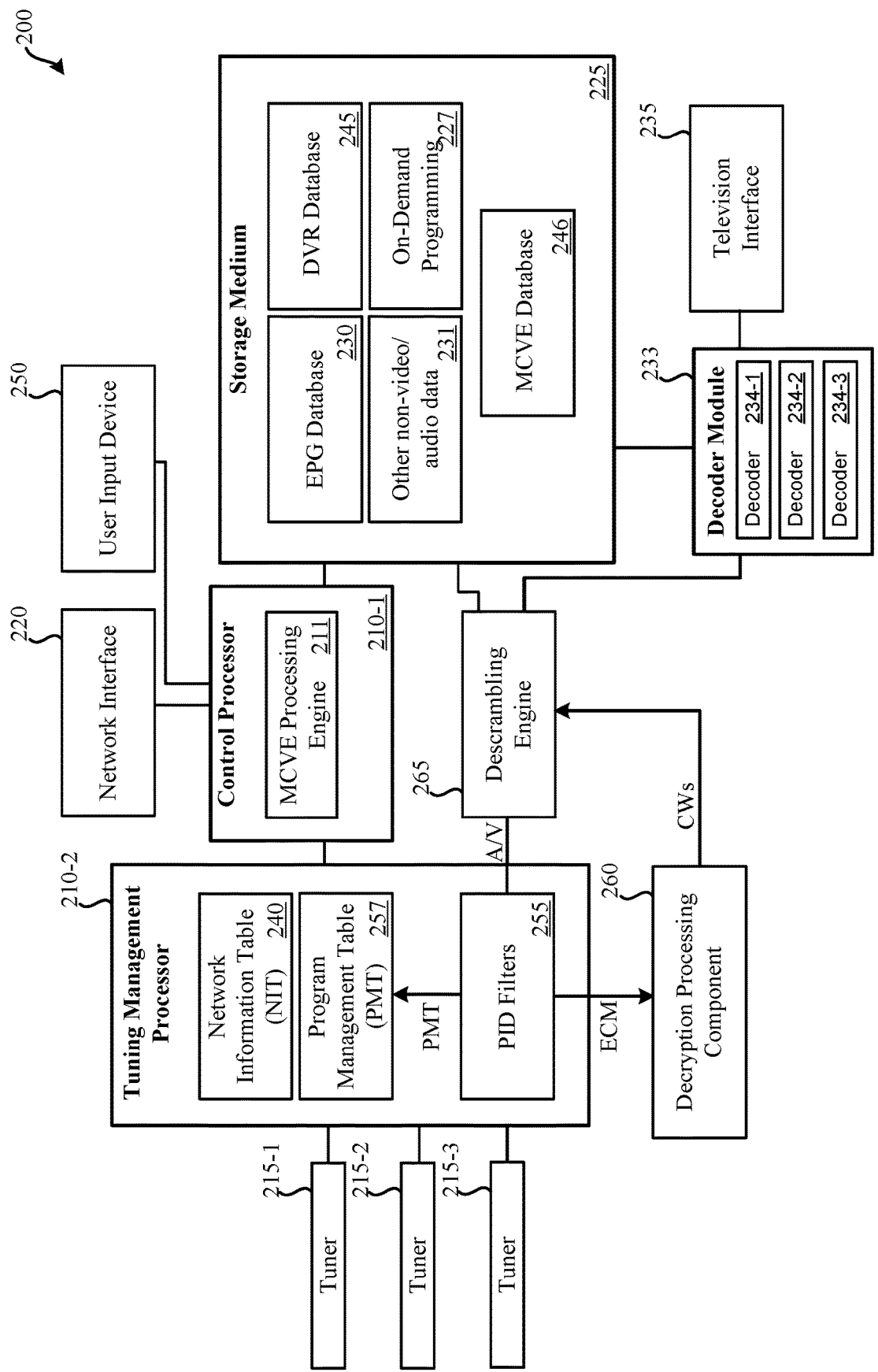
FIG. 2 illustrates an embodiment of a television receiver that processes and presents a multichannel viewing event (MCVE).

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled. For example, transponder stream 180-1 may be a first transponder stream containing a first group of television channels, while transponder stream 180-2 may be a second transponder stream containing a different group of television channels. When a television channel is received as part of a transponder stream and is decoded and output to display device 160 (rather than first storing the television channel to a storage medium as part of DVR functionality then later outputting the television channel from the storage medium), the television channel may be considered to be viewed "live."

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams. As such, depending on which television channels are desired to be presented or stored, various transponder streams from various satellites may be received, descrambled, and decoded by television receiver 150.

Network 190 may serve as a secondary communication channel between television service provider system 110 and television receiver 150. However, in many instances, television receiver 150 may be disconnected from network 190 (for reasons such as because television receiver 150 is not configured to connect to network 190 or a subscriber does not desire or cannot connect to network 190). As such, the connection between network 190 and television receiver 150 is represented by a dotted line. Via such a secondary communication channel, bidirectional exchange of data may occur. As such, data may be transmitted to television service provider system 110 from television receiver 150 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190. In some embodiments, MCVE definitions may be transmitted to television receiver 150 via network 190 from MCVE creation engine 111 of television service provider system 110.

The television service provider that operates television service provider system 110 may define an MCVE. In some embodiments, additionally or alternatively, a user may be permitted to access MCVE creation engine 111 via network 190 from a computerized device (e.g., computer, smartphone, etc.) and create a user-defined MCVE. The definition of the MCVE may then be pushed to television receiver 150 via either network 190 or via the television provider distribution network (which, in the embodiment of FIG. 1, involves satellites 130).

MCVE creation engine 111 may be used to have a television service provider and/or user define: a number of television channels that are to be included in the MCVE, a title for the MCVE, a time period (i.e., a start time and end time) for the MCVE, and a ranking of television channels for the MCVE. It may be possible for a user to search a database of available MCVE's stored by MCVE creation engine 111 to select one or more service provider and/or user-defined MCVEs for transmission to a television receiver associated with the user. In some embodiments, at least some of the MCVEs are pushed to television receivers by the television service provider regardless of whether the user has requested the MCVE. For instance, for a popular event, such as the Olympics, the television service provider may desire to make the MCVE available at all possible television receivers. MCVE engine 300, which controls how television receiver 150 handles MCVEs, is detailed in relation to FIG. 3.

FIG. 2 illustrates an embodiment of television receiver 200. Television receiver 200 may be configured to output for presentation a MCVE based on a receive MCVE definition. Television receiver 200 may be in the form of a separate device configured to be connected with a display device, such as a television. Embodiments of television receiver 200 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 200 may represent television receiver 150 of FIG. 1 and may be in the form of an STB that outputs video and/or audio to a display device, such as a television. Television receiver 200 may be incorporated as part of a television, such as display device 160 of FIG. 1. Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, television interface 235, networking information table (NIT) 240, digital video recorder (DVR) database 245 (which may include provider-managed television programming storage and/or user-defined television programming), on-demand programming 227, user profiles 247, programming preview database 248, user input device 250, decryption processing component 260 (which can be in the form of a removable or non-removable smartcard), and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID (packet identifier) filters 255 may be handled by separate hardware from program management table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and user input device 250. Control processor 210-1 may handle incoming data from network interface 220 and user input device 250. Additionally, control processor 210-1 may be configured to output data via network interface 220. Control processor 210-1 may include a MCVE processing engine 211. Embodiments of a MCVE processing engine 211 are described in relation to FIG. 3.

Tuners 215 may include one or more tuners used to tune to transponders that include broadcasts of one or more television channels. In the illustrated embodiment of television receiver 200, three tuners are present (tuner 215-1, tuner 215-2, and tuner 215-3). In other embodiments, two or more than three tuners may be present, such as four, six, or eight tuners. Each tuner contained in tuners 215 may be capable of receiving and processing a single transponder stream from a satellite transponder at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies or transponder streams to tune.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220. For instance, instructions (e.g., regarding subscription portability, MCVE definitions) from a television service provider may also be received via network interface 220, if connected with the Internet. Network interface 220 may be used to provide a confirmation to a television service provider that instructions received from the television service provider have indeed been executed.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to EPG database 230, other non-video/audio data 231, DVR database 245, MCVE database 246 and/or on-demand programming 227. Recorded television programs, which were recorded based on a provider- or user-defined timer may be stored using storage medium 225 as part of a DVR database. Storage medium 225 may be partitioned or otherwise divided (such as into folders) such that predefined amounts of storage medium 225 are devoted to storage of television programs recorded due to user-defined timers and stored television programs recorded due to provider-defined timers.

MCVE database 246 may serve to store definitions of MCVE events that have been provided by the television service provider or directly input to the television receiver by a user. Further detail regarding MCVE database 246 is provided in relation to FIG. 3.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously.

The network information table (NIT) 240 may store information used by television receiver 200 to access various television channels. NIT 240 may be stored locally by a processor, such as tuning management processor 210-2 and/or by storage medium 225. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers (which may be used to ensure different satellites are tuned to for reception of timing signals), frequency identifiers and/or transponder identifiers for various television channels. In some embodiments, NIT 240 may contain additional data or additional tables may be stored by the television receiver. For example, while specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency. If, for a first television channel, multiple television channels are to be tuned to, NIT 240 and/or PMT 257 may indicate a second television channel that is to be tuned to when a first channel is tuned to.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

While a large portion of storage space of storage medium 225 is devoted to storage of television programming, a portion may be devoted to storage of non-audio/video data, such as EPG database 230 and other non-video/audio data 231. This "other" data may permit television receiver 200 to function properly. In some embodiments, at least ten gigabytes are allocated to such other data. For example, if NIT 240 is stored by storage medium 225, it may be part of other non-video/audio data 226.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265 simultaneously. For instance, each of decoders 234 within decoder module 233 may be able to only decode a single television channel at a time. While decoder module 233 is illustrated as having three decoders 234 (decoder 234-1, decoder 234-2, and decoder 234-3), in other embodiments, a greater or fewer number of decoders may be present in television receiver 200. A decoder may be able to only decode a single high definition television program at a time.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 230 and/or information from EPG database 230) to a television for presentation. Television interface 235 may serve to output a MCVE interface to a presentation device or television. This MCVE interface may present multiple (e.g., four) television channels simultaneously, possibly all in high definition.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, referring to satellite-based television distribution system 100 of FIG. 1, in a satellite-based television service provider system, data necessary to create the provider-defined timers at television receiver 150 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

On-demand programming 227 may represent additional television programming stored by storage medium 225. On-demand programming 227 may include television programming that was not recorded to storage medium 225 via a timer (either user- or provider-defined). Rather, on-demand programming is programming provided to the television receiver directly for storage by the television receiver and for later presentation to one or more users. On-demand programming may not be user-selected. As such, the television programming stored to on-demand programming storage 227 may be the same for each television receiver of a television service provider.

User input device 250 may include a remote control (physically separate from television receiver 200) and/or one or more buttons on television receiver 200 that allow a user to interact with television receiver 200. User input device 250 may be used to select a television channel for viewing, view information from EPG database 230, and/or program a timer stored to DVR database 245, wherein the timer is used to control the DVR functionality of control processor 210-1. In some embodiments, it may be possible to load some or all of preferences to a remote control. As such, the remote control can serve as a backup storage device for the preferences.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with a particular television channel. Particular data packets, referred to as entitlement control messages (ECMs), may be periodically transmitted. ECMs may be associated with another PID and may be encrypted; television receiver 200 may use decryption engine 261 of decryption processing component 260 to decrypt ECMs. Decryption of an ECM may only be possible if the user has authorization to access the particular television channel associated with the ECM. When an ECM is determined to correspond to a television channel being stored and/or displayed, the ECM may be provided to decryption processing component 260 for decryption.

When decryption processing component 260 receives an encrypted ECM, decryption processing component 260 may decrypt the ECM to obtain some number of control words. In some embodiments, from each ECM received by decryption processing component 260, two control words are obtained. In some embodiments, when decryption processing component 260 receives an ECM, it compares the ECM to the previously received ECM. If the two ECMs match, the second ECM is not decrypted because the same control words would be obtained. In other embodiments, each ECM received by decryption processing component 260 is decrypted; however, if a second ECM matches a first ECM, the outputted control words will match; thus, effectively, the second ECM does not affect the control words output by decryption processing component 260. Decryption processing component 260 may be permanently part of television receiver 200 or may be configured to be inserted and removed from television receiver 200.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created based on the PMT data. The PID filter created, based on the PMT data packets, may be known because it is stored as part of NIT 240 or another table, such as a program association table (PAT). From the PMT data packets, PMT may be constructed by tuning management processor 210-2.

PID filters 255 may be configured to filter data packets based on PIDs. In some embodiments, PID filters 255 are created and executed by tuning management processor 210-2. For each television channel to be output for presentation or recorded, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user may be ignored by PID filters 255. As such, only data packets corresponding to the one or more television channels desired to be stored and/or displayed may be filtered and passed to either descrambling engine 265 or decryption processing component 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2.

Descrambling engine 265 may use the control words output by decryption processing component 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by decryption processing component 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to decoder module 233 for output to a television or other presentation equipment via television interface 235.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 900 of FIG. 9.

Figure 3:
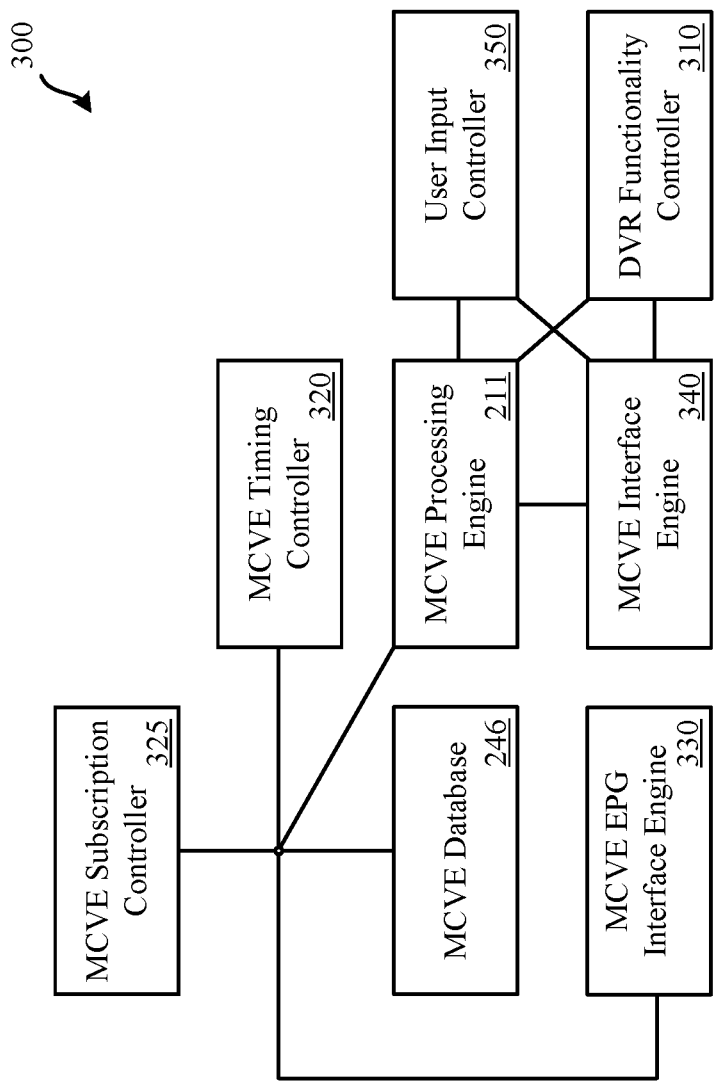
FIG. 3 illustrates an embodiment of a MCVE engine.

FIG. 3 illustrates an embodiment of an MCVE engine 300. MCVE engine 300 may be integrated as part of a television receiver (such as television receiver 200) and may use various components of the television receiver to function, such as control processor 210-1 and storage medium 225. MCVE engine 300 may include: MCVE processing engine 211, MCVE database 246, DVR functionality controller 310, MCVE timing controller 320, MCVE EPG interface engine 330, MCVE interface engine 340, and user input controller 350.

MCVE processing engine 211 may be executed by control processor 210-1 of a television receiver and may coordinate receipt, processing, and output of MCVE events. MCVE processing engine 211 may receive and process received MCVE definitions. MCVE processing engine 211 may store the definition of a received MCVE to MCVE database 246 if the MCVE definition was addressed to the television receiver. If not addressed to the television receiver, decryption processing component 260 may not have decrypted the received MCVE definition and may have discarded it. MCVE database 246 may store one or more MCVE definitions. An MCVE definition may be discarded from MCVE database 246 after its end time. An exemplary MCVE definition is provided in Table 1.

TABLE 1

| Title | 2016 Basketball Tournament |
|---|---|
| Description | All your favorite college basketball action in one place! |
| Graphic File | [Basketball.jpg] |
| Start Date/Time | 4/27/16\|4:00 PM |
| End Date/Time | 5/6/16\|10:00 PM |
| Channel (Rank 1) | 027 |
| Channel (Rank 2) | 834 |
| Channel (Rank 3) | 102 |
| Channel (Rank 4) | 105 |
| Channel (Rank 5) | 013 |
| Channel (Rank 6) | 855 |
| Channel (Rank 7) | 802 |

Table 1 indicates a sample MCVE definition which can be sent to various television receivers. It should be understood that table 1 is merely an example; other embodiments may have fewer or greater number of fields and/or ranked television channels.

MCVE timing controller 320 may analyze a current time and date against a start and end time and date indicated as part of an MCVE definition. In order for the MCVE to be available for activation, the current time may be required to be determined by MCVE timing controller 320 to be between the start and end time specified in the MCVE definition stored in MCVE database 246. In some embodiments, MCVE timing controller 320 can delete MCVE definitions from MCVE database 246 when an MCVE definition's end time has passed. User-defined MCVE's (as opposed to provider-defined MCVE's) may not have start and end times. Such MCVE definitions may persist in MCVE database 246 until deleted by a user. In other embodiments, a user (be it a user of the television receiver or some other user that has created the MCVE definition) may specify a start and end time. An MCVE definition may have multiple start and stop times. For instance, a basketball tournament may be broadcast between 6-10 PM on consecutive nights. The MCVE may only be available for user activation during or near those two time periods.

While many MCVEs may have a common theme (e.g., basketball games, the Olympics), other MCVEs may simply be television channels that a user or users tend to want to view at the same time. For example, a stock ticker channel, a weather channel, a sports channel, and a movie channel could be used as part of an MCVE. As such, it should be understood that a grouping of any channels desired by a television service provider or user can be used to create an MCVE.

MCVE subscription controller 325 can serve to analyze channels indicated in an MCVE definition against a subscription activate at the television receiver. MCVE subscription controller 325 may provide an indication to MCVE processing engine 211 of which television channels of the MCVE definition are accessible based on the active subscription. Based on which channels are available, MCVE processing engine 211 may select the four (or some other number) of the highest ranked television channels that are available based on data from MCVE subscription controller 325 and a ranking indicated in the MCVE definition.

MCVE EPG interface engine 330 may indicate, such as via a graphical element, when an MCVE is available for selection within an electronic programming guide. An icon or other form of graphical element may be presented; this icon or graphical element may be provided (or referenced from a locally-stored library) as part of the MCVE definition. For instance, a picture of the Olympic Rings may represent an Olympics MCVE. In some embodiments, for a time before and/or after an MCVE is available (based on the time periods analyzed by MCVE timing controller 320), the icon or graphical element may be presented as part of the EPG by MCVE EPG interface engine 330, but may be unselectable. For instance, the icon or graphical element may be grayed out or otherwise unselectable. An example of an MCVE presented in an EPG by MCVE EPG engine 330 is presented in FIG. 4.

Figure 5:
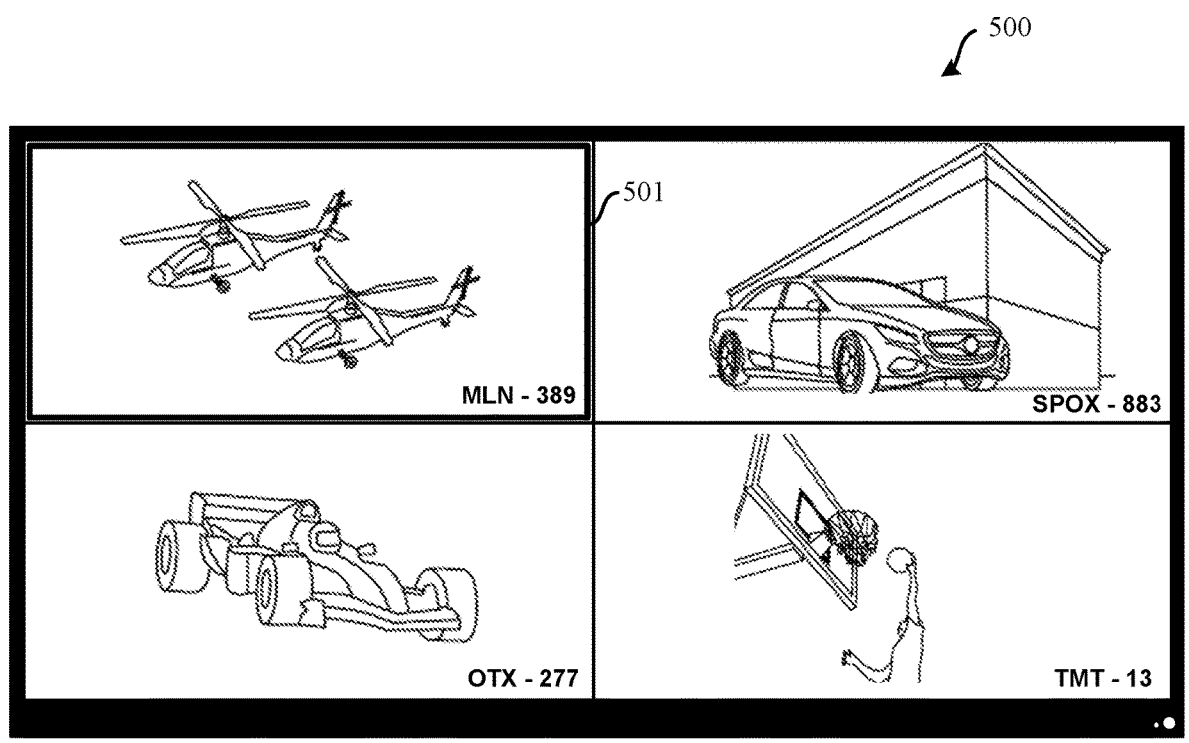
FIG. 5 illustrates an embodiment of an MCVE being presented.

MCVE interface engine 340 may cause the MCVE to be presented, based on the four (or some other number) of highest-ranked television channels from the MCVE definition when the MCVE has been activated (e.g., in response to user input) during the time period of the MCVE. An example of an MCVE interface is illustrated in FIG. 5. MCVE interface engine 340 may cause the MCVE to be output for presentation in four quadrants of a television's display or other presentation device. As such, the video signal output to the presentation device may be formatted such that four different television channels will be presented simultaneously. Each of these channels may be output in their respective received resolution, which may be 1080P, thus resulting in a quad-high definition signal being output to a display device. Each of the television channels output as part of the MCVE may be output at the full resolution at which the television channel is received from the television service provider. MCVE interface engine 340 may cause only a single audio stream to be output at a given time. The audio steam may be selected based on user input from user input controller 350. Further, user selection of a particular channels from the MCVE interface may cause that particular television channels to be presented in full-screen mode. When selected, since a tuner is already tuned to the proper transponder stream and one or more PID filters have already been created, switching to full-screen mode of the television channel may occur quickly, since presentation over the full display screen rather than a quadrant (or some other portion) may be the only adjust that needs to be made.

Figure 6:
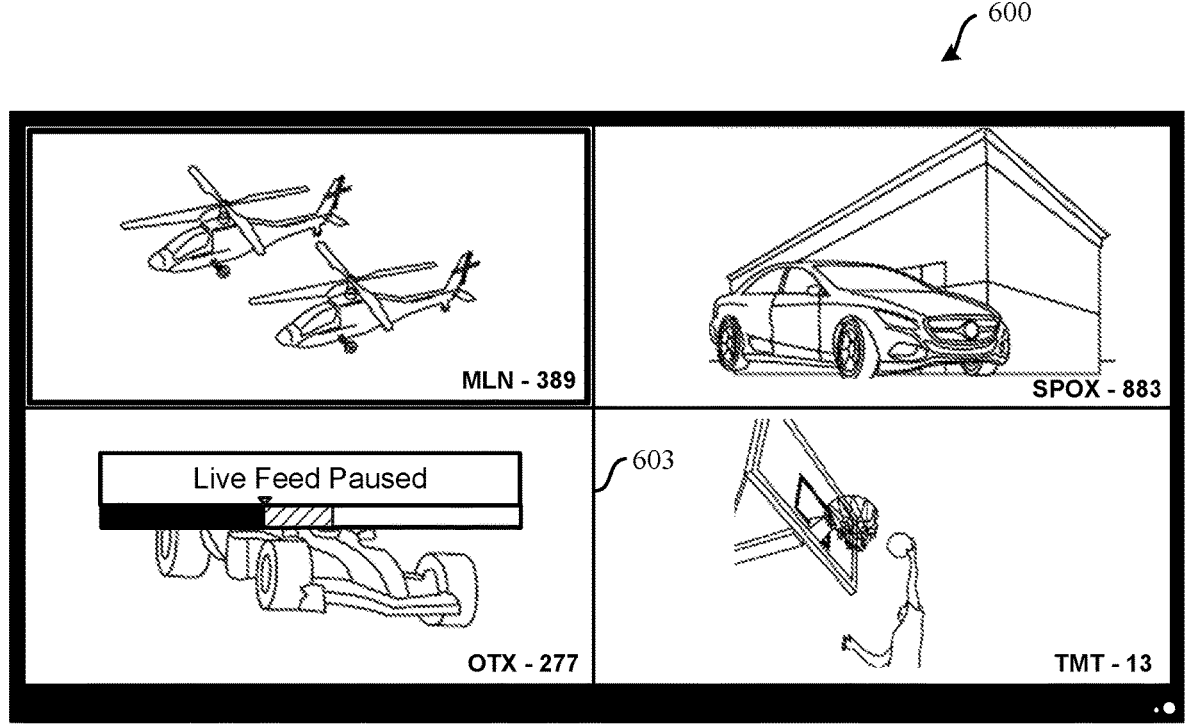
FIG. 6 illustrates an embodiment of an MCVE in which each television channel has individually-controllable DVR functionality.

DVR functionality controller 310 may allow a user to control various DVR functions while the MCVE interface is active. For instance, delayed live playback may be applied to any or all of the television channels be presented by MCVE interface engine 340, such as is illustrated in FIG. 6. A user may be able to "pause" live television by causing the television channel to be recorded while the channel is locally "paused"—playback from the recorded portion of the television channel continues when the user un-pauses playback. Recording continues until the user's playback position catches back up to the live broadcast (such as via fast forwarding).

User input controller 350 may allow a user to provide input to MCVE processing engine 211, MCVE interface engine 340, and DVR functionality controller 310. The user can: enable/disable presentation of the MCVE event, select which television channel should have its audio output, select a television channel for full-screen presentation, and control DVR functionality relative to the television channels presented as part of the MCVE. User input controller 350 may be based on buttons on a remote control pressed by a user or input provided from an app being executed by a computerized device. DVR functionality controller 310 may also allow a user to apply other DVR functionalities to television channels being presented as part of an MCVE, such as recording based on a user- or provider-defined timer.

Figure 4:
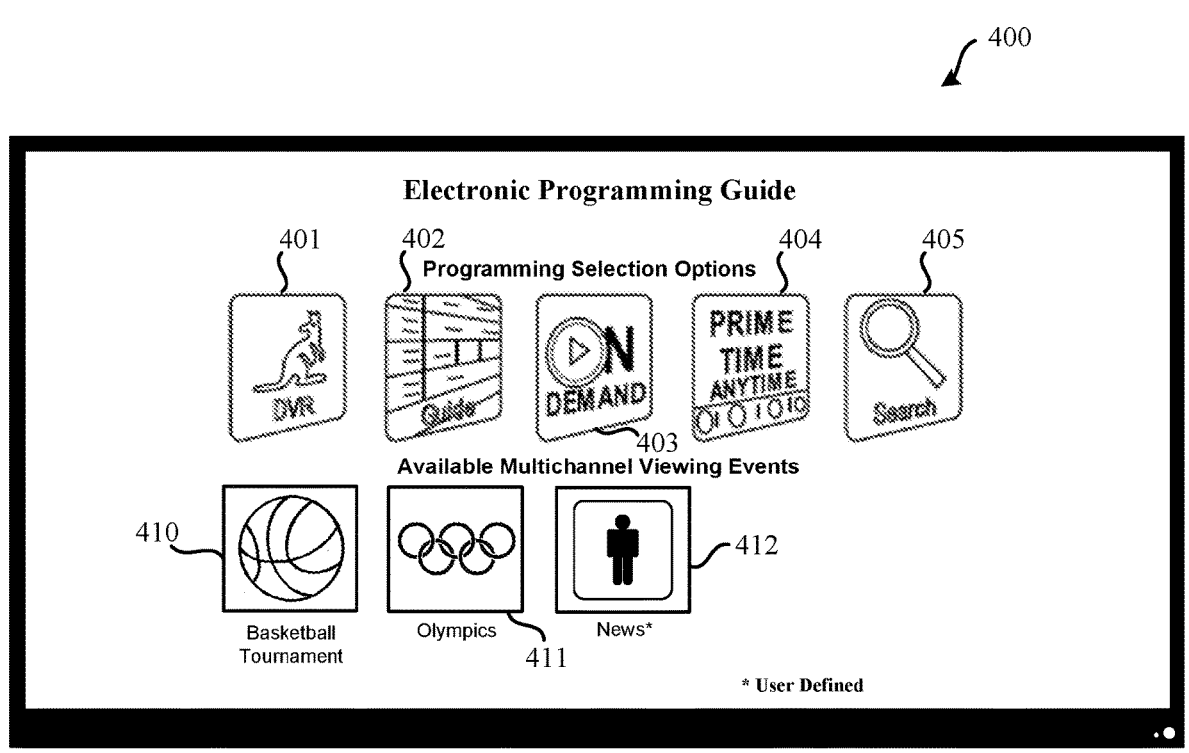
FIG. 4 illustrates an embodiment of an electronic programming guide (EPG) that allows for activation of an MCVE.

FIG. 4 illustrates an embodiment of an electronic programming guide (EPG) being presented by a display device 400 that permits enablement of an MCVE. On the illustrated EPG, various functionalities of the television receiver are presented as icons or graphical elements, such as: DVR element 401, guide element 402, on-demand element 403, Prime Time Anytime element 404, and search 405. As part of the EPG, three available MCVE's are presented: basketball tournament MCVE 410, Olympics MCVE 411, and news MCVE 412. Each of these MCVE's are represented by its respective title and graphical element, which were provided as part of the MCVE definition. A user may select any of these three MCVE's to view as desired by the user. MCVE's may appear and disappear (or be grayed out or otherwise indicated as unavailable) based on the MCVE's scheduled start and stop times. In some embodiments, MCVE's are presented for a defined amount of time before and after the MCVE's scheduled start and stop times (e.g., one day) but are unselectable. The MCVE elements of FIG. 4 may be understood to be "single-selection" options. This term refers to the concept that by a user providing a single instance of user input to select an MCVE (e.g., via a button on a remote control or selection in an EPG), the MCVE will present four (or some other number) of television channels simultaneously using an MCVE interface in accordance with a stored MCVE definition, such as in the embodiment of FIG. 5.

In the illustrated embodiment, basketball tournament MCVE 410 may cause a first set of television channels to be presented in an MCVE interface; Olympics MCVE 411 may cause a second set of television channels to be presented in an MCVE interface; and news MCVE 412 may cause a third set of television channels to be presented in an MCVE interface. It may be possible that some of these MCVE's have television channel overlap (e.g., a basketball game that is part of the Olympics may also be presented as part of the basketball tournament). It many instances, there will be no television channel overlap between MCVEs.

News MCVE 412 is denoted by the EPG as user-defined. Basketball tournament MCVE 410 and Olympics MCVE 411 are provider defined—meaning these MCVEs were defined by the television service provider and broadcast to many television receivers. News MCVE 412, however, was defined by a user. This user may be a user of the television receiver that is outputting the EPG of FIG. 4 or may be a remote user that has shared a definition of an MCVE. For instance, a user may be permitted to provide access to his user-defined MCVE via MCVE creation engine 111 and television service provider system 110. Other users may then acquire and use such a shared MCVE.

FIG. 5 illustrates an embodiment of an MCVE being presented by a display device 500 that displays an MCVE. This MCVE, may be, for example, sports—presenting basketball, F-1 racing, street racing, and helicopter racing. Each of the presented four television channels are output to a display device such that each channel occupies a different quadrant of the display device's screen. Channel 501 is highlighted via a rectangle that outlines the television channel. This may indicate that the audio for channel 501 is active and being output. The audio for the other three channels may be suppressed or audio PID filters may not be instantiated for the audio of such channels. Via a user input device, a user may select which channel is selected and has its audio output. Further, when a channel is selected, user input may cause the television channel to be presented in full-screen mode. When a television channel in an MCVE is selected to be switched to full-screen mode, no tuners or PID filters may need to be reconfigured. Rather, PID filters may be kept activated for the four television channels with one or more tuners tuned as-is. Rather than the full resolution feed of the selected television channel being output in a quadrant of the display device, it may be presented full screen. User input while in full screen mode may cause the MCVE interface to be presented again. Again here, since the PID filters and tuning of the one or more tuners were not modified, no tuners or PID filters may need to be configured to return on the MCVE interface of FIG. 5.

FIG. 6 illustrates an embodiment of an MCVE interface being presented by a display device 600. In this MCVE interface, each television channel is individually controllable. Channel 603 has live television "paused" using the DVR capability of the television receiver outputting the MCVE interface. Each other television channel of the MCVE may be presented live. It should be understood that user-input may be used to pause more than one of the four television channels presented. If a user switches a television channel to full screen mode, which channels are "paused" and which are not may remain as previously set in the MCVE interface. That way, if a user exits full screen mode and returns to the MCVE interface, the user's previous selections of which channels are paused and which are live may remain.

Figure 7:
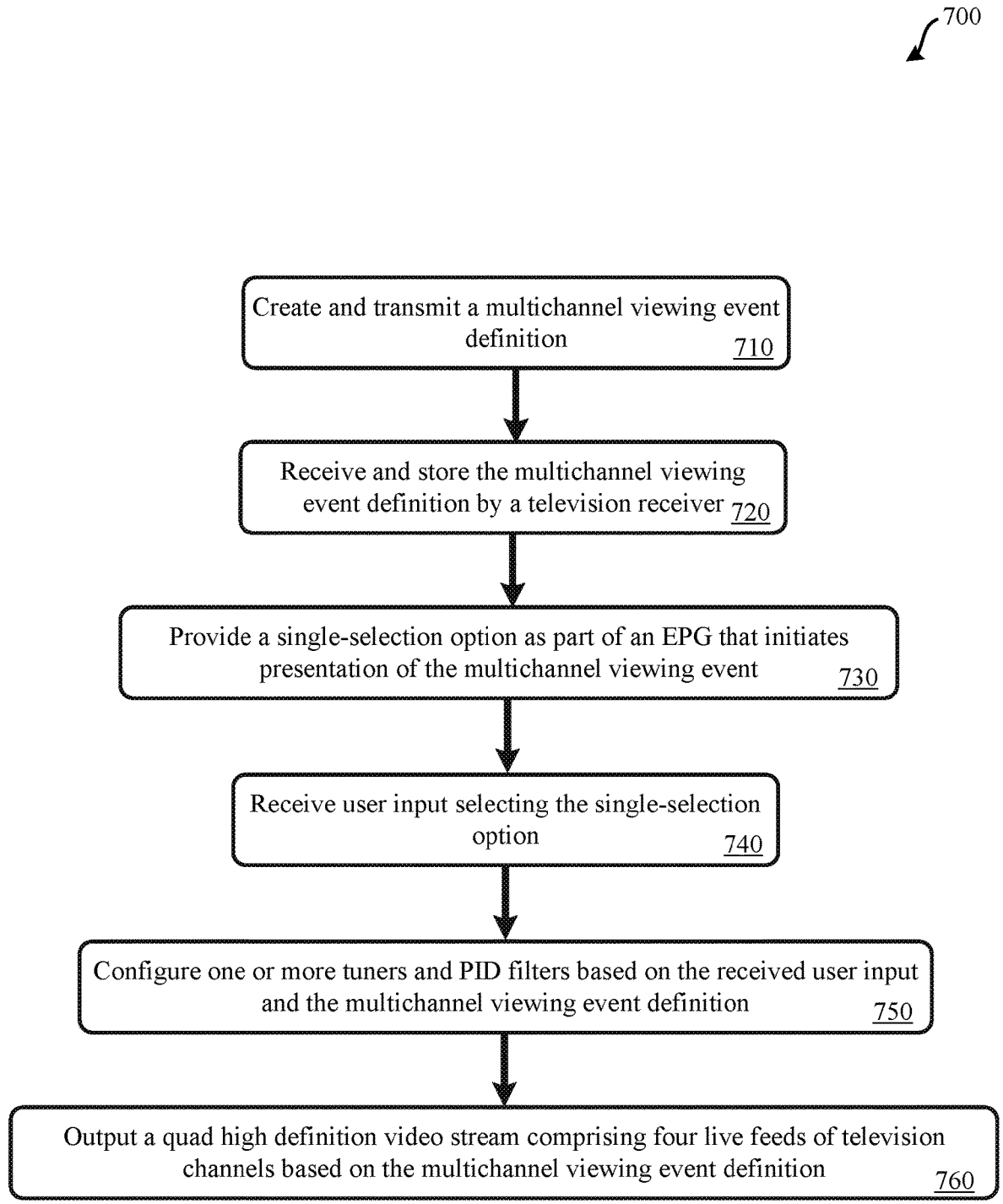
FIG. 7 illustrates an embodiment of a method for providing an MCVE.

Various methods may be performed using the systems detailed in relation to FIGS. 1-6. FIG. 7 illustrates an embodiment of a method 700 for providing an MCVE. Steps of method 700 may be performed using various components of system 100, including television service provider system 110 and television receiver 150. It should be understood that while system 100 is a satellite-based television distribution system, method 700 may be performed using other forms of television distribution systems, including cable- and IP-based television distribution systems.

At block 710, a MCVE definition may be created by a television service provider system and transmitted to one or more television receivers. The MCVE definition may contain fields similar to those presented in relation to Table 1. The MCVE definition may be transmitted in the form of messages that can be processed and implemented by a television receiver. In some embodiments, the MCVE definition may be embedded in a software update or firmware update to the television receiver. For instance, the television receiver may have an operating system in which an MCVE can be hard-coded. When the television receiver receives and installs the updated operating system software or firmware, the MCVE may be stored by the television receiver. At block 720, a television receiver, to which the MCVE definition is addressed, may receive and store the MCVE definition. If the MCVE definition is incorporated as part of a software or firmware update, the television receiver may update its software or firmware, and thus store and process the MCVE.

At block 730, an MCVE based on the definition received at block 720 may be presented as part of an EPG by the television receiver. The MCVE may only be presented if the current time falls within a period of time defined as part of the MCVE definition. In other embodiments, the MCVE event may be presented, but may be unselectable for a predefined period of time before and/or after the time period of the MCVE definition. In still other embodiments, separate time periods may be included as part of the MCVE definition that indicates an amount of time before and/or after the time period that the MCVE is accessible for which the MCVE single-selection option is presented, but is unavailable. In some embodiments, a MCVE may be directly accessible via a button on a remote control. For instance, an "MCVE" button may initiate an MCVE, if one is available at the television receiver for selection. Whether the MCVE selection is made directly via a button on a remote control or via a user navigating an EPG to a single-selection MCVE option, at block 740 the user may provide input that initiates the MCVE.

At block 750, the television receiver analyzes the MCVE definition to start the MCVE. The television receiver may tune one or more tuners to transponder streams that include the television channels specified by the MCVE definition. In some embodiments, if multiple channels of the MCVE appear on a single transponder stream, only a single tuner may be tuned to that transponder stream in order to receive the multiple television channels. For each of the television channels of the MCVE, at least a video PID filter may be configured. An audio PID filter may be configured for at least the television channel to have audio output by default (e.g., the highest ranked television channel or the channel to be presented in the upper-left of the screen of the display device). Audio PID filters for the other channels may also be configured, but the audio packets may be discarded unless the user selects one of the channels for audio output at a later time. The PID filters may be based on data stored by the television receiver in the form of various tables as previously detailed in relation to FIG. 2. For instance, the NIT and PMT of FIG. 2 may be used to determine transponder streams that correspond to particular television channels and the PIDs on such transponder streams that correspond to audio and video streams of such television channels. Once the one or more tuners are tuned for the MCVE and the PID filters configured, regardless of whether a user views the MCVE channels as part of a multichannel quadrant view (such as in FIG. 5 or 6) or the user selects a particular television channel of the MCVE for full screen viewing the tuning of the tuners and configuration of the PID filters can remain unchanged. The television channels of the MCVE may be decoded to full resolution and output as such in the output signal to a connected display device, such as in 1080P resolution.

At block 760, the MCVE interface may be output by the television receiver to a display device. The MCVE interface can present the television channels of the MCVE definition in full resolution (e.g., high definition, if such television channels are broadcast in high definition). Each of the television channels may be presented "live." That is, the television channels are not first recorded—but are presented as currently being received from the television service provider via a television service provider network. Such an MCVE interface may resemble the exemplary interface of FIG. 5. A user may then, if desired, "pause" the live broadcast of any of the television channels using the television receiver's DVR functionality.

Figure 8:
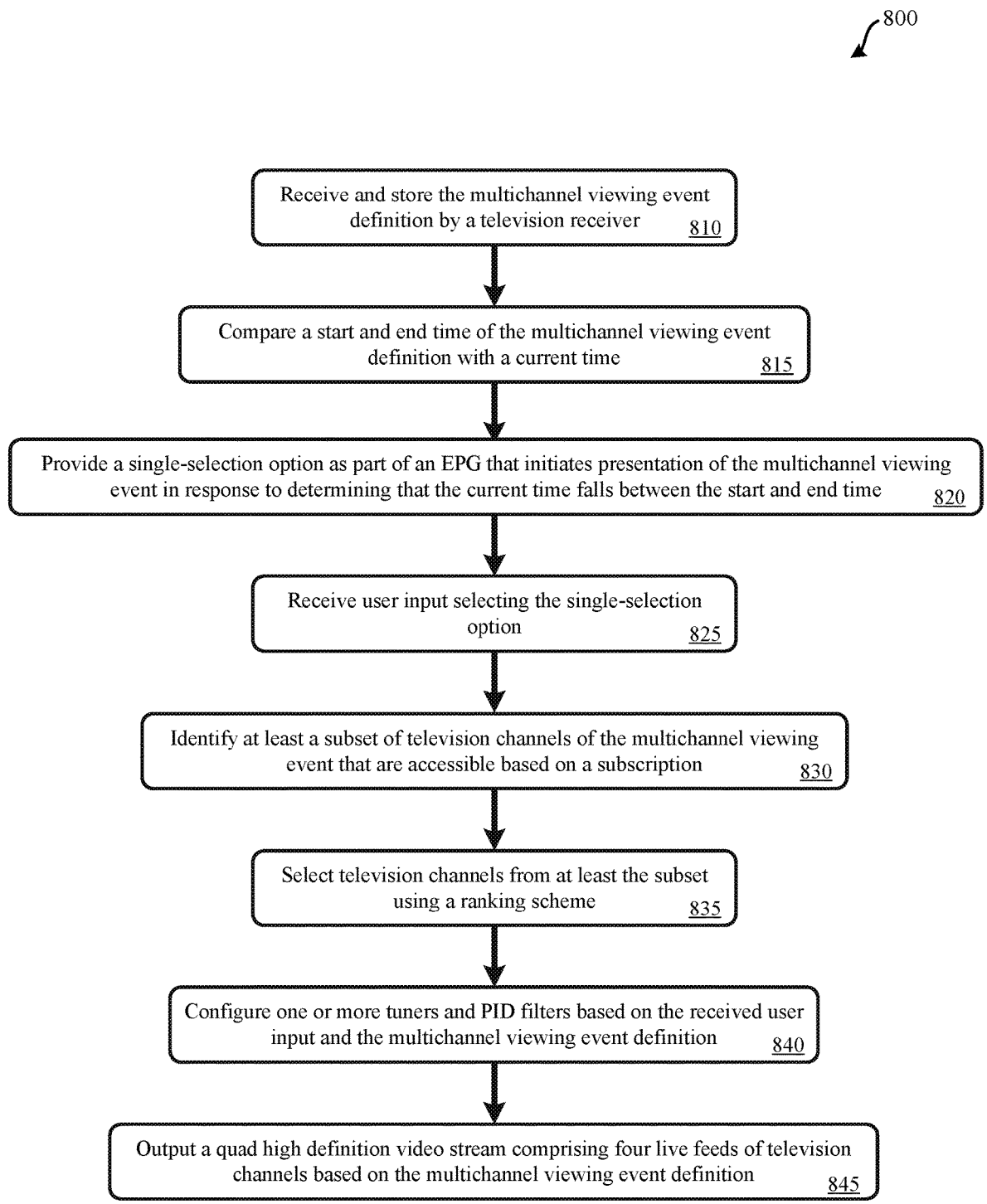
FIG. 8 illustrates another embodiment of a method for providing an MCVE.

FIG. 8 illustrates another embodiment of a method 800 for providing an MCVE. Method 800 can represent a more detailed embodiment of method 700. Steps of method 800 may be performed using various components of system 100, including television receiver 150. It should be understood that while system 100 is a satellite-based television distribution system, method 800 may be performed using other forms of television distribution systems, including cable- and IP-based television distribution systems.

At block 810, a television receiver, to which an MCVE definition is addressed, may receive and store the MCVE definition. If the MCVE definition is incorporated as part of a software or firmware update, the television receiver may update its software or firmware, and thus store and process the MCVE. The MCVE may be user or provider defined.

At block 815, a comparison may be performed between a start time and date of the MCVE definition, an end time and date of the MCVE definition, and the current time and date. At block 820, the MCVE may be presented as part of an EPG by the television receiver only if the current time is with the MCVE definition's defined time period. In other embodiments, the MCVE event may be presented, but may be unselectable for a predefined period of time before and/or after the time period of the MCVE definition. In still other embodiments, separate time periods may be included as part of the MCVE definition that indicates an amount of time before and/or after the time period that the MCVE is accessible for which the MCVE single-selection option is presented, but is unavailable. In some embodiments, a MCVE may be directly accessible via a button on a remote control. For instance, an "MCVE" button may initiate an MCVE, if one is available at the television receiver for selection. Whether the MCVE selection is made directly via a button on a remote control or via a user navigating an EPG to a single-selection MCVE option, at block 825 the user may provide input that initiates the MCVE.

At block 830, an analysis may be performed by the television receiver, such as by a subscription controller, to determine which television channels of the MCVE definition the television receiver has the rights to decode and access based on a user's subscription. While an MCVE may typically involve the presentation of four television channels, the MCVE definition may include more than four television channels, that way if any of the four highest ranked television channels of the MCVE cannot be decoded, one or more alternate television channels may be presented instead. At block 835, the television channels selected to be presented from the MCVE may be the highest ranked television channels, as ranked as part of the MCVE definition, and for which the television receiver can decode based on the subscription active at the television receiver. The highest ranked television channel to be presented may, by default, have its audio stream output. As such, an audio PID filter at block 840 may be configured for the highest ranked television channel. In some embodiments, audio PID filters are configured for all the television channels of the MCVE, but audio packets associated with television channels that are not having their audio stream output may have audio packets discarded.

At block 840, the television receiver analyzes the MCVE definition to start the MCVE. The television receiver may tune one or more tuners to transponder streams that include the television channels specified by the MCVE definition. In some embodiments, if multiple channels of the MCVE appear on a single transponder stream, only a single tuner may be tuned to that transponder stream in order to receive the multiple television channels. For each of the television channels of the MCVE, at least a video PID filter may be configured. An audio PID filter may be configured for at least the television channel to have audio output by default (e.g., the highest ranked television channel or the channel to be presented in the upper-left of the screen of the display device). Additional detail regard the configuration of the tuners and PID filters are detailed in relation to block 750 of method 700. In a quad MCVE, four video PID filters may be configured and at least one audio PID filter (e.g., for the highest-ranked television channel according to the MCVE definition).

At block 845, the MCVE interface may be output by the television receiver to a display device. The MCVE interface can present the television channels of the MCVE definition simultaneously in full resolution (e.g., high definition, if such television channels are broadcast in high definition). Each of the television channels may be presented "live." That is, the television channels are not first recorded—but are presented as currently being received from the television service provider via a television service provider network. Such an MCVE interface may resemble the exemplary interface of FIG. 5. A user may then, if desired, "pause" the live broadcast of any of the television channels using the television receiver's DVR functionality.

Figure 9:
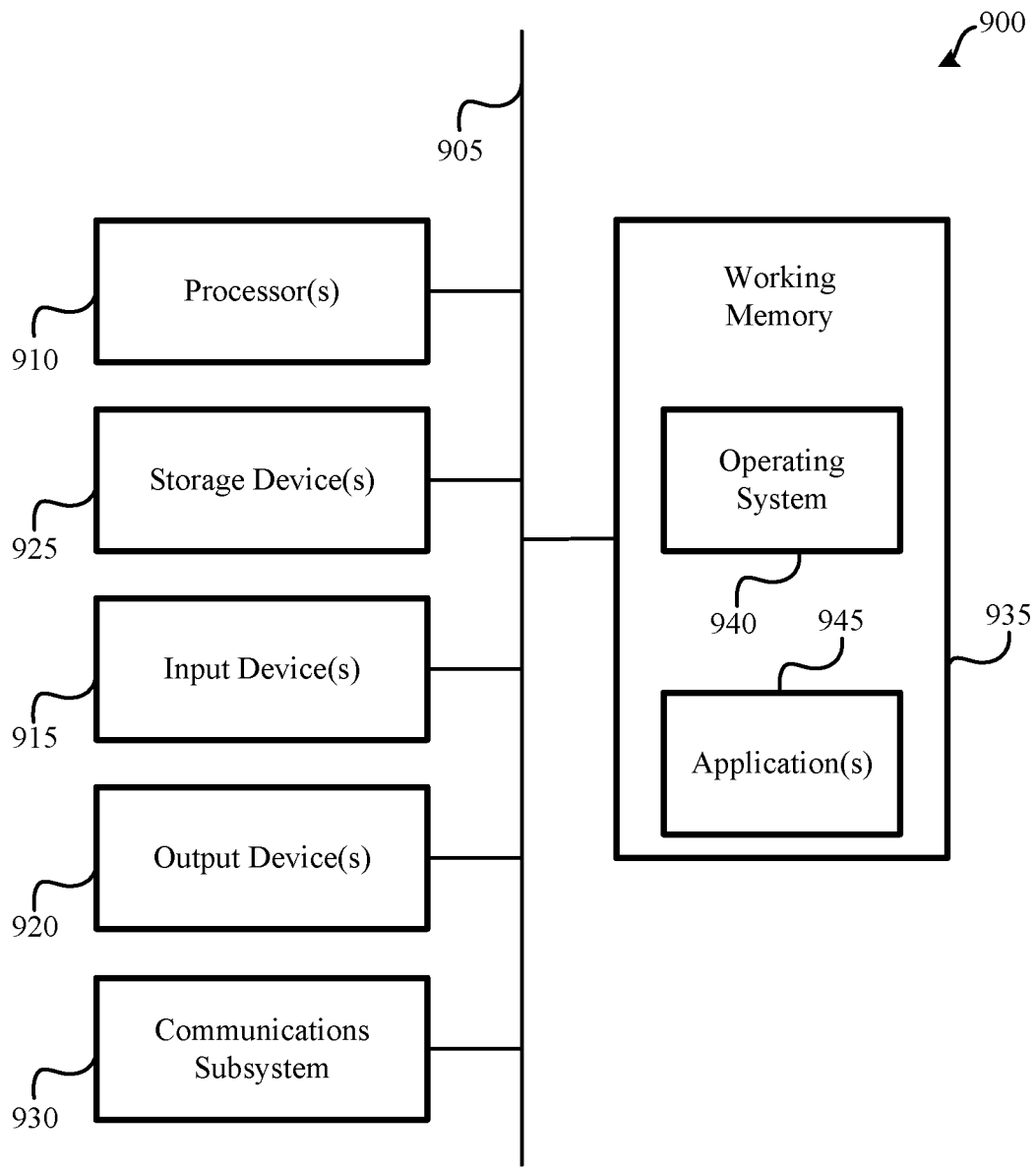
FIG. 9 illustrates an embodiment of a computer system that can be incorporated as part of the television receivers and television service provider systems detailed herein.

FIG. 9 illustrates an embodiment of a computer system 900 that can be incorporated as part of the television receivers and television service provider systems detailed herein. FIG. 9 provides a schematic illustration of one embodiment of a computer system 900 that can perform various steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication). The hardware elements may include one or more processors 910, including without limitation one or more general-purpose processors and/or one or more special-purpose processors (such as digital signal processing chips, graphics acceleration processors, video decoders, and/or the like); one or more input devices 915, which can include without limitation a mouse, a touchscreen, keyboard, remote control, and/or the like; and one or more output devices 920, which can include without limitation a display device, a printer, etc.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should further be understood that the components of computer system 900 can be distributed across a network. For example, some processing may be performed in one location using a first processor while other processing may be performed by another processor remote from the first processor. Other components of computer system 900 may be similarly distributed. As such, computer system 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for creating and watching a multichannel viewing event, the method comprising:
   creating, using a computerized user device, a multichannel viewing event definition, wherein:
      the multichannel viewing event is created by an end user;
      the multichannel viewing event definition defining a plurality of television channels to be included as part of the multichannel viewing event; and
      the multichannel viewing event definition comprises a start time and an end time for the multichannel viewing event;
   transmitting, by the computerized user device, the multichannel viewing event definition to a television service provider system;
   receiving, by the television service provider system, the multichannel viewing event definition from the computerized user device;
   transmitting, by the television service provider system, the multichannel viewing event definition to a television receiver;
   storing, by the television receiver, the definition of the multichannel viewing event;
   providing, by the television receiver, as part of an electronic programming guide (EPG), a single-selection option to activate the multichannel viewing event based on the multichannel viewing event definition;
   receiving, by the television receiver, user input that selects the single-selection option;
   in response to receiving the user input that selects the single-selection option, accessing, by the television receiver, the stored definition of the multichannel viewing event;
   in response to the user input and the accessed stored definition of the multichannel viewing event, tuning one or more tuners of the television receiver based on the plurality of television channels defined in the definition of the multichannel viewing event; and output a video stream that comprises live feeds of multiple television channels from the plurality of television channels, and, when presented by a display device, the video stream results in the live feeds of the multiple television channels being presented simultaneously.

2. The method of claim 1, wherein the multichannel viewing event definition is received by the television service provider system via the Internet.

3. The method of claim 1, wherein creating the multichannel viewing event definition further comprises: identifying a ranking of the plurality of television channels to be included in the multichannel viewing event definition.

4. The method of claim 3, wherein a predefined number of the highest ranked television channels that are available are output as part of the video stream.

5. The method for providing the multichannel viewing event of claim 3, further comprising:
selecting, by the television receiver, a default television channel from the plurality of television channels for audio output based on the ranking, wherein the audio output is enabled for only a single television channel at a given time.

6. The method of claim 1, wherein creating the multichannel viewing event definition further comprises: providing a title of the multichannel viewing event definition, wherein the title is indicated as part of the EPG in association with the single-selection option.

7. The method of claim 1, wherein providing, as part of the EPG, the single-selection option to activate the multichannel viewing event based on the multichannel viewing event definition occurs after the start time and before the end time.

8. The method for providing the multichannel viewing event of claim 1, wherein providing, by the television receiver, the single-selection option to activate the multichannel viewing event based on the multichannel viewing event definition comprises providing a plurality of single-selection options, comprising the single-selection option, wherein each single-selection option of the plurality of single-selection options activates a different multichannel viewing event based on distinct multichannel viewing event definitions.

9. The method for providing the multichannel viewing event of claim 1, further comprising:
in response to the user input and the accessed stored definition of the multichannel viewing event, instantiating a plurality of packet identifier (PID) filters, the plurality of PID filters comprising multiple PID filters, wherein for each television channel a video PID filter is instantiated.

10. A method for creating and watching a multichannel viewing event, the method comprising:
receiving, by a television service provider system, a multichannel viewing event definition from an end user of a television receiver, the multichannel viewing event definition defining a plurality of television channels to be included as part of the multichannel viewing event provided to the television receiver;
transmitting, by the television service provider system, the multichannel viewing event definition to the television receiver;
storing, by the television receiver, the definition of the multichannel viewing event;
providing, by the television receiver, as part of an electronic programming guide (EPG), a single-selection option to activate the multichannel viewing event based on the multichannel viewing event definition;
receiving, by the television receiver, user input that selects the single-selection option;
in response to receiving the user input that selects the single-selection option, accessing, by the television receiver, the stored definition of the multichannel viewing event;
in response to the user input and the accessed stored definition of the multichannel viewing event, tuning one or more tuners of the television receiver based on the plurality of television channels defined in the definition of the multichannel viewing event;
output a video stream that comprises live feeds of multiple television channels from the plurality of television channels, and, when presented by a display device, the video stream results in the live feeds of the multiple television channels being presented simultaneously;
receiving, by the television service provider system, a request to delete the multichannel viewing event definition from the end user of the television receiver;
transmitting, by the television service provider system, the request to delete the multichannel viewing event definition to the television receiver; and
removing, by the television receiver, the single-selection option to activate the multichannel viewing event from the EPG based on the request to delete the multichannel viewing event.

11. A system for creating and watching a multichannel viewing event, the system comprising:
a television service provider system, configured to:
receive a multichannel viewing event definition, the multichannel viewing event definition defining a plurality of television channels to be included as part of the multichannel viewing event provided to a television receiver;
transmit the multichannel viewing event definition to the television receiver;
the television receiver, comprising:
a plurality of tuners;
one or more processors; and
a memory communicatively coupled with and readable by the one or more processors and having stored therein processor-readable instructions which, when executed by the one or more processors, cause the one or more processors to:
receive the multichannel viewing event from the television service provider system;
store the definition of the multichannel viewing event;
provide, as part of an electronic programming guide (EPG), a single-selection option to activate the multichannel viewing event based on the multichannel viewing event definition;
receive user input that selects the single-selection option; and
in response to the user input, output a video stream that comprises live feeds of multiple television channels from the plurality of television channels, and, when presented by a display device, the video stream results in the live feeds of the multiple television channels being presented simultaneously; and
a computerized end user device, configured to:
create the multichannel viewing event definition, wherein the multichannel viewing event is created by an end user and comprises a start time and an end time for the multichannel viewing event; and transmit the multichannel viewing event definition to the television service provider system.

12. The system for creating and watching the multichannel viewing event of claim 11, wherein the multichannel viewing event definition is received by the television service provider system via the Internet.

13. The system for creating and watching the multichannel viewing event of claim 11, wherein the computerized end user device being configured to create the multichannel viewing event definition further comprises the computerized end user device being configured to receive a ranking of the plurality of television channels to be included in the multichannel viewing event definition.

14. The system for creating and watching the multichannel viewing event of claim 13, wherein the television receiver is further configured to output a predefined number of the highest ranked television channels that are available as part of the video stream.

15. The system for creating and watching the multichannel viewing event of claim 11, wherein the computerized end user device being configured to create the multichannel viewing event definition further comprises the computerized end user device being configured to provide a title of the multichannel viewing event definition, wherein the title is indicated as part of the EPG in association with the single-selection option.

16. The system for creating and watching the multichannel viewing event of claim 11, wherein the television receiver being configured to provide, as part of the EPG, the single-selection option to activate the multichannel viewing event based on the multichannel viewing event definition occurs after the start time and before the end time.

\* \* \* \* \*